US008606759B2

(12) United States Patent
Cha et al.

(10) Patent No.: US 8,606,759 B2
(45) Date of Patent: Dec. 10, 2013

(54) APPARATUS, SYSTEM AND METHOD FOR RECOVERING META DATA USING FRAGMENTARY INFORMATION

(75) Inventors: Myung Hoon Cha, Daejeon (KR); Hong Yeon Kim, Daejeon (KR); Young Kyun Kim, Daejeon (KR); Han Namgoong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 155 days.

(21) Appl. No.: 13/192,343

(22) Filed: Jul. 27, 2011

(65) Prior Publication Data

US 2012/0117031 A1    May 10, 2012

(30) Foreign Application Priority Data

Nov. 4, 2010   (KR) .................. 10-2010-0109336

(51) Int. Cl.
*G06F 7/00*     (2006.01)
(52) U.S. Cl.
USPC ........................... 707/674; 707/675; 707/686

(58) Field of Classification Search
None
See application file for complete search history.

(56) References Cited

U.S. PATENT DOCUMENTS

| 6,611,836 B2* | 8/2003 | Davis et al. ........................... 1/1 |
| 2003/0163493 A1* | 8/2003 | Burns et al. .................... 707/204 |
| 2005/0195660 A1* | 9/2005 | Kavuri et al. ............. 365/189.05 |
| 2006/0129614 A1* | 6/2006 | Kim et al. ..................... 707/202 |
| 2010/0198718 A1 | 8/2010 | Morosan et al. |
| 2010/0223620 A1 | 9/2010 | Nair et al. |

* cited by examiner

*Primary Examiner* — Anh Tai Tran (57) ABSTRACT

Disclosed are an apparatus, a system, and a method for recovering meta data using fragmentary information. The system for recovering meta data includes: a data server storing recovery information for recovering at least one data file and meta data related to each of the data file; and a meta data server storing the meta data related to the data files and receiving the recovery information from the data server when the meta data are lost to recover the lost meta data. By this configuration, the exemplary embodiment of the present invention stably can the lost meta data of the meta data server by using the recovery the meta data and prevent the phenomenon that the meta data collides with each other on the same directory hierarchical structure.

6 Claims, 6 Drawing Sheets

APPARATUS, SYSTEM AND METHOD FOR RECOVERING META DATA USING FRAGMENTARY INFORMATION

CROSS-REFERENCE TO RELATED APPLICATIONS

This application claims priority to and the benefit of Korean Patent Application No. 10-2010-0109336 filed in the Korean Intellectual Property Office on Nov. 4, 2010, the entire contents of which are incorporated herein by reference.

TECHNICAL FIELD

The present invention relates to a method for recovering meta data, and more particularly, to an apparatus, a system, and a method for recovering meta data using fragmentary information capable of recovering lost meta data of a meta data server by using recovery information on meta data stored in a data server when the meta data are lost.

BACKGROUND

Generally, when a file is stored in a computer, a system of separately storing a meta data, and data or data files has been used. For example, in an environment using a plurality of computers connected by a network, some computers are used to store meta data and the remaining computers to store data files. In addition, even in the environment using a single computer, the storage location of the meta data and the data files may be separated.

In this environment, when the meta data are lost due to an accident, or the like, it is impossible to find where the stored position of the data files is, such that it is impossible to use the system even though a data area has been saved well.

In order to countermeasure the possibility of losing meta data, a method of periodically backing up an area in which meta data are stored may be considered, but cannot completely exclude the possibility of losing meta data due to the time intervals when the meta data are backed up, or the like.

Further, as in a system of providing a wastebasket function, a system of saving files to be deleted in a separate area such as a wastebasket, or the like, without immediately deleting the files to be deleted may be considered. In this case, a collision problem may occur at the time of recovering meta data after the meta data are lost. For example, a user deletes file 'file1' existing in a file storage path or a directory 'A/B', but the file 'file1' is not actually deleted from the data area by the wastebasket function. In this case, a new file 'file1' may be stored in the directory '/A/B'. Under this circumference, when the meta data are lost, which 'file1' to recover from the two 'file1' in the data area in the directory '/A/B' becomes a serious problem.

SUMMARY

The present invention has been made in effort to provide an apparatus, a system, and a method for recovering meta data using fragmentary information capable of recovering lost meta data of a meta data server by using recovery information on meta data stored in a data server when the meta data are lost.

An exemplary embodiment of the present invention provides a system for recovering meta data, including: a data server storing recovery information for recovering at least one data file and meta data related to each of the data file; and a meta data server storing the meta data related to the data files and receiving the recovery information from the data server when the meta data are lost to recover the lost meta data.

The data server may include: a data storage unit in which at least one data file is stored; and a recovery information storage unit generating and storing recovery information for recovering the meta data related to the data file, when the data files are stored in the data storage unit.

The recovery information may include location information on a directory hierarchical structure in which the data files are stored and stored time information.

The meta data server may manages: a directory table storing a directory hierarchy in which the data files are stored and an identification ID allocated to the directory hierarchy; a meta data table storing the identification ID allocated to the directory hierarchy and the corresponding meta data; and a wastebasket table storing the meta data related to the deleted data files.

The meta data may include an identification ID allocated to the directory hierarchy of the data server in which the data files are stored, a name of the data server in which the data files are stored, and a file name of the data files.

The meta data server may compare time information included in the recovery information with storage time included in the meta data already stored when the meta data related to the data files to be recovered are already recovered and move the meta data related to the data files to be recovered to the wastebasket storage area and deletes them, when the time information included in the recovery information is earlier than the storage time included in the meta data already recovered according to the compared results.

The meta data server may move the already recovered meta data to the wastebasket storage area and deletes them when the time information included in the recovery information is later than the storage time included in the meta data already recovered according to the compared results and recover the meta data include in the recovery information.

Another exemplary embodiment of the present invention provides an apparatus for recovering meta data, including: a directory hierarchical storage unit storing the entire directory hierarchical structure in which at least one data file is stored; a meta data storage unit storing the meta data related to the data files; a wastebasket storage area storing the directory hierarchical structure and meta data related to the data files when the deletion of the data files is requested; a meta data recovery unit recovering the lost meta data using recovery information provided from a data server when the meta data are lost; and a controller controlling the directory hierarchical storage unit, the meta data storage unit, the wastebasket storage area, and the meta data recovery unit.

The wastebasket storage area may store the directory hierarchical structure and the meta data related to the data files, but delete the meta data from the directory hierarchical storage unit and the meta data storage unit, when it receives the deletion request of the data files.

The meta data recovery unit may use the recovery information to recover the lost meta data and the directory hierarchical structure corresponding to the meta data.

Yet exemplary embodiment of the present invention provides a method for recovering meta data, including: confirming whether a directory hierarchical structure included in recovery information is generated and generating the directory hierarchical structure according to the confirmed results, when a meta data server receives the recovery information; confirming whether meta data corresponding to the recovery information are already present, when the directory hierarchical structure is generated; comparing time information included in the recovery information with storage time included in the already recovered meta data, when the meta data corresponding to the recovery information are already present; and moving the already recovered meta data to the wastebasket storage area and deleting them when the time information included in the recovery information is a later time than the storage time included in the already recovered meta data and recovering the meta data corresponding to the recovery information.

The recovering may move the already recovered meta data to the wastebasket storage area and delete them and recovers the meta data to be recovered and the directory hierarchical structure corresponding to the meta data using the recovery information.

The method for recovering meta data may further include recovering the meta data included in the recovery information when the meta data corresponding to the recovery information are not present.

The recovery information may include location information on a directory hierarchical structure in which the data files are stored and the stored time information.

The meta data may include an identification ID allocated to the directory hierarchy in which the data files are stored, a name of the data server in which the data files are stored, and a file name of the data files.

The method for recovering meta data may further include moving the meta data related to the data files to be recovered to the wastebasket storage area and deleting them when the time information included in the recovery information is earlier than the storage time included in the already recovered meta data.

As set forth above, the exemplary embodiment of the present invention recover the lost meta data of the meta data server by using the recovery information on the meta data stored in the data server when the meta data are lost, thereby making it possible to stably recover the meta data.

Further, the exemplary embodiment of the present invention recovers the lost meta data of the meta data server by using the recovery information on the meta data stored in the data server when the meta data are lost, thereby making it possible to prevent the meta data from colliding on the same directory hierarchical structure.

DETAILED DESCRIPTION

Hereinafter, exemplary embodiments of the present invention will be described in detail with reference to the accompanying drawings. In this description, when any one element is connected to another element, the corresponding element may be connected directly to another element or with a third element interposed therebetween. First of all, it is to be noted that in giving reference numerals to elements of each drawing, like reference numerals refer to like elements even though like elements are shown in different drawings. The components and operations of the present invention illustrated in the drawings and described with reference to the drawings are described as at least one exemplary embodiment and the spirit and the core components and operation of the present invention are not limited thereto.

Hereinafter, an apparatus, a system, and a method for recovering meta data using fragmentary information according to an exemplary embodiments of the present invention will be described with reference to FIGS. 1 to 7, but components required to understand the operations and effects according to the exemplary embodiments of the present invention will be mainly described.

The exemplary embodiments of the present invention proposes a method capable of stably recovering lost meta data of a meta data server using recovery information on meta data stored in a data server when the meta data are lost in a system of separately storing meta data and data.

Figure 1:
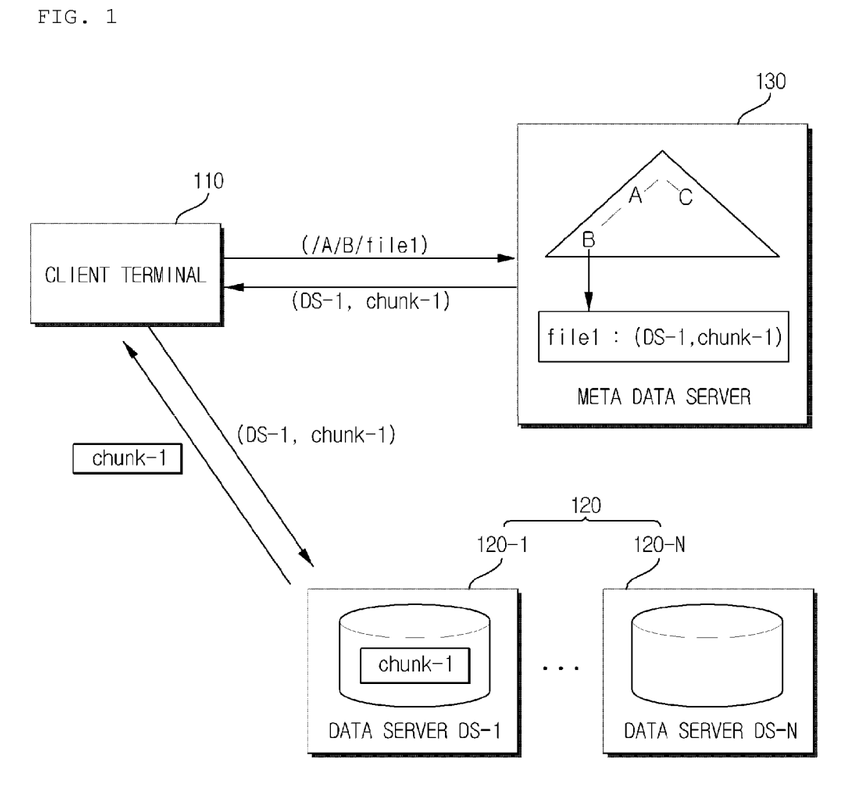
FIG. 1 is an exemplified diagram schematically showing a configuration of an overall system according to an exemplary embodiment of the present invention.

FIG. 1 is an exemplified diagram schematically showing a configuration of an overall system according to an exemplary embodiment of the present invention.

As shown in FIG. 1, a system according to the exemplary embodiment of the present invention may be configured to include a client terminal 110, a plurality of data servers 120, a meta data server 130, or the like. That is, data files may be stored in any one of a plurality of data servers 120-1, . . . , 120-N and meta data related to the data files may be stored in the meta data server 130.

The client terminal 110 acquires the meta data related to the data files to be searched and acquires storage location information on the data files to be searched based on the acquired meta data, that is, identification information (for example, name, IP address, ID, or the like) of a data server, in which the data files are stored, from the meta data server 130.

The client terminal 110 accesses the corresponding data server according to the acquired storage location information to acquire the data files related to the meta data from the accessed data server.

The data server 120 stores the data files and the information (hereinafter, referred to as recovery information) for recovering the meta data related to the data files, which will be described with reference to FIG. 2.

Figure 2:
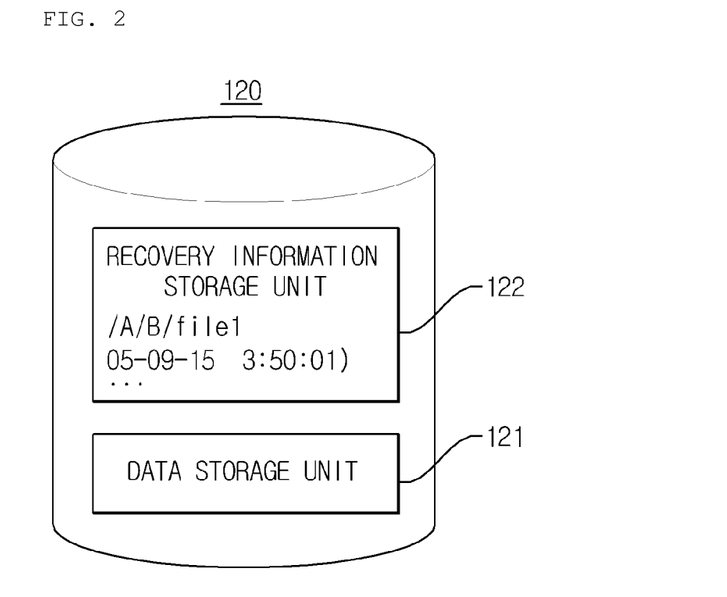
FIG. 2 is an exemplified diagram showing a detailed configuration of a data server 120 shown in FIG. 1.

FIG. 2 is an exemplified diagram showing a detailed configuration of the data server 120 shown in FIG. 1.

As shown in FIG. 2, the data server 120 according to the exemplary embodiment of the present invention may be configured to include a data storage unit 121, a recovery information storage unit 122, etc. The data storage unit 121 may store various data files and the recovery information storage unit 122 may store the recovery information.

In this case, the recovery information may include location information on a directory hierarchical structure in which the data files are stored, stored time information, or the like. For example, 'A/B/file1' may indicate that data file 'file1' is stored in the directory hierarchical structure 'A/B' and '05-09-15 3:50:01' may indicate that the data files are stored at 05-09-15 3:50:1.

Therefore, even though the meta data for the data file 'file1' are lost, it is possible to recover the lost directory hierarchical structure and the meta data using the recovery information.

In this case, the recovery information may be stored in an area adjacent to the data files as a header type.

Figure 3:
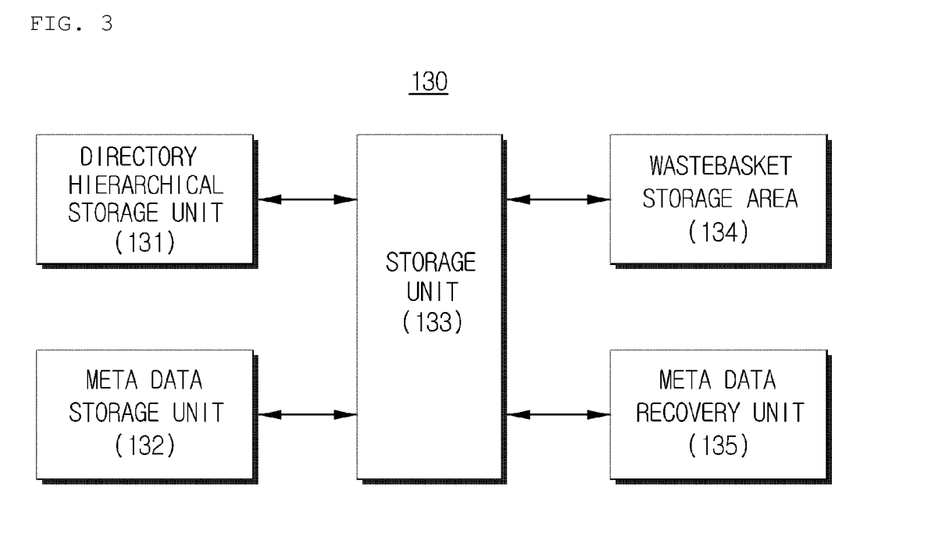
FIG. 3 is an exemplified diagram showing a detailed configuration of a meta data server 130 shown in FIG. 1.

FIG. 3 is an exemplified diagram showing a detailed configuration of the meta data server 130 shown in FIG. 1.

As shown in FIG. 3, the meta data server 130 according to the exemplary embodiment of the present invention may be configured to include a directory hierarchical storage unit 131, a meta data storage unit 132, a controller 133, a wastebasket storage area 134, a meta data recovery unit 135, or the like.

The directory hierarchical storage unit 131 may store the overall directory hierarchical structure in which the data files are stored and the meta data storage unit 132 may store meta data related to the data files.

Figure 4:
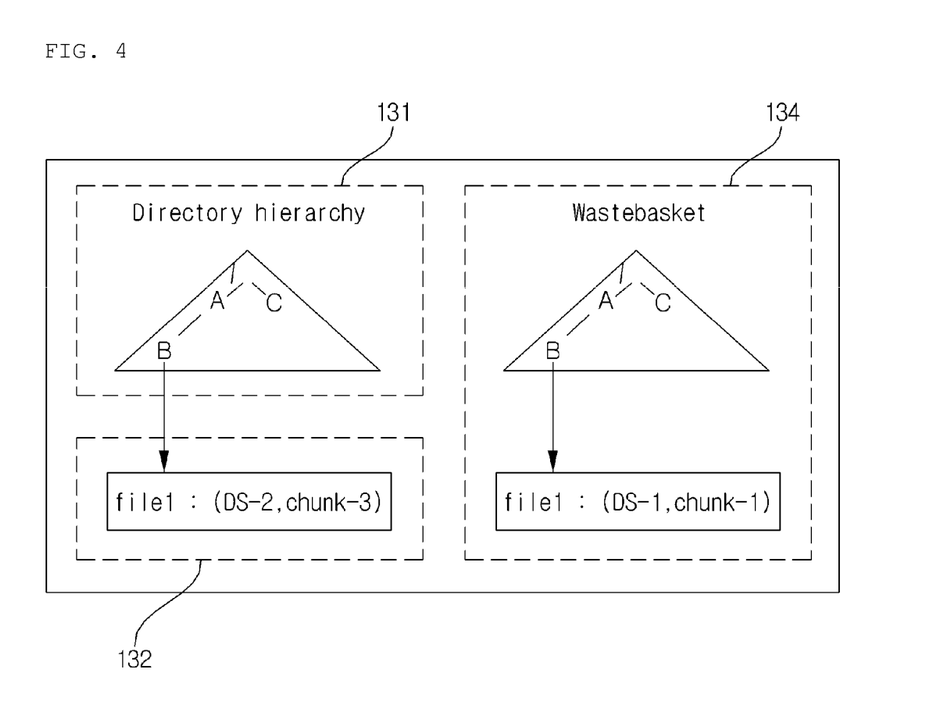
FIG. 4 is an exemplified diagram for explaining a storage principle of meta data according to an exemplary embodiment of the present invention.

FIG. 4 is an exemplified diagram for explaining a storage principle of meta data according to an exemplary embodiment of the present invention.

As shown in FIG. 4, when a user stores data file 'file1' in the directory hierarchical 'A/B', the directory hierarchical storage unit 131 may generate and store the directory hierarchical structure as a tree type. In this case, each directory hierarchical structure is allocated with an identification ID. For example, a directory hierarchical structure '/A' is allocated with 10, a directory hierarchical structure '/C' is allocated with 20, and a directory hierarchical structure '/A/B' is allocated with 100, or the like, in order to differentiate the directory hierarchical structure.

In this case, the directory hierarchical storage unit 131 may store and manage the directory hierarchical structure and the corresponding identification ID as a table type (hereinafter, referred to as a directory table).

The meta data storage unit 132 stores the meta data related to the data files. The meta data may include, for example, the identification ID 100 allocated to the directory hierarchical structure in which the data files are stored, a name DS-2 of the data server in which the data files are stored, and a file name chunk-3 of data file 'file1', or the like.

In this case, the meta data storage unit 132 may store and manage the identification ID and the corresponding meta data as a table type (hereinafter, referred to as a meta data table).

In addition, when the wastebasket storage area 134 receives a deletion request for the data files, the directory hierarchical structure related to the requested data files, the meta data, or the like, are moved from the directory hierarchical storage unit 131 and the meta data storage unit 132 and are stored. For example, the wastebasket storage area 134 receives the identification ID 100 allocated to the directory hierarchical structure '/A/B', a data server DS-1 in which the data files are stored, the file name chunk-1 of the data file 'file1', and the storage time 05-09-15 3:50:01 of the data file 'file1', or the like, and stores them.

In this case, the wastebasket storage area 134 may store and manage the meta data related to the deleted data files as the table type (hereinafter, referred to as a wastebasket table). In this case, the contents of the wastebasket table are the meta data related to the deleted data files and therefore, may be implemented identically with the contents of the meta data table.

Again describing this, when the data file called 'A/B/file1' is deleted, the data files are not deleted in the data server, only the corresponding data stored in the meta data server are deleted, and the meta data are newly moved to the wastebasket storage area 134 and are stored therein. During this process, when the previous directory hierarchical structure of the meta data is not stored in the wastebasket storage area 134, the directory hierarchical structure is stored in the wastebasket storage area 134.

Therefore, when recovering the data files stored in the wastebasket storage area 134, it can locate the correct data servers on which the deleted data files are stored by referring to the meta data, and the correct directories in which deleted data files are located by referring to the directory hierarchical structure.

The meta data recovery unit 135 serves to recover the lost meta data. That is, the meta data recovery unit 135 receives the recovery information from the data server and may recover the directory hierarchical structure, the meta data, or the like, using the recovery information.

The controller 133 serves to control the directory hierarchical storage unit 131, the meta data storage unit 132, the wastebasket storage area 134, the meta data storage recovery unit 135, or the like.

Hereinafter, a process of storing the data files will be described.

Figure 5:
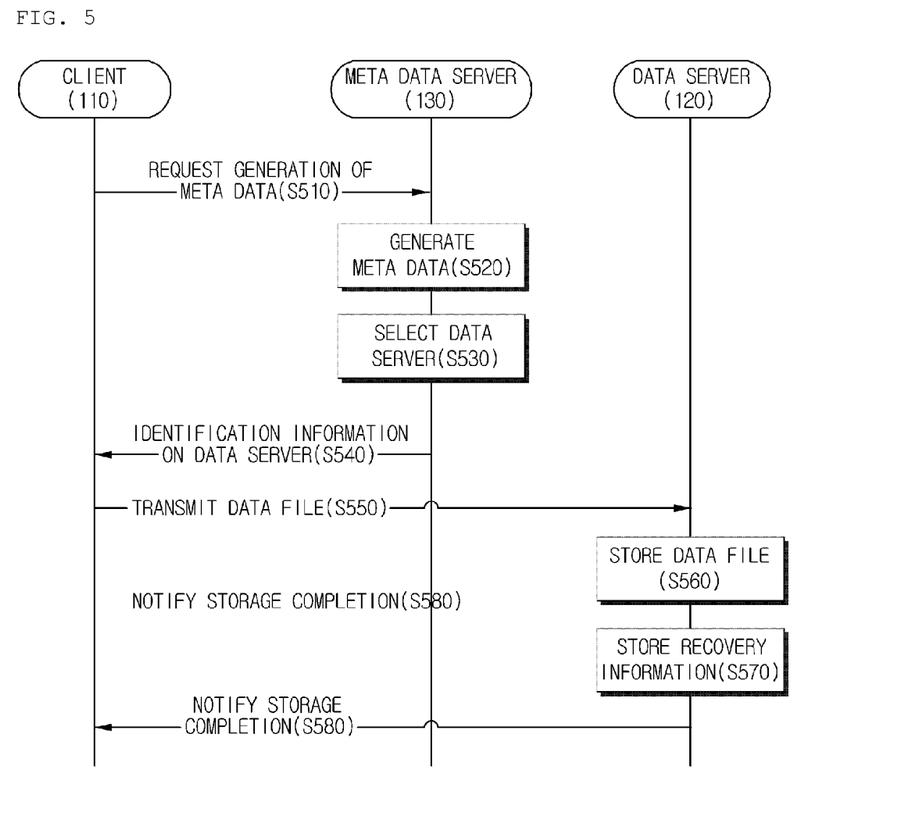
FIG. 5 is an exemplified diagram showing a method of storing data according to an exemplary embodiment of the present invention.

FIG. 5 is an exemplified diagram showing a method of storing data according to an exemplary embodiment of the present invention.

As shown in FIG. 5, when the data files are stored, the client terminal may request the generation of the meta data related to the data files to the meta data server (S510). The meta data server may generate and store the meta data related to the requested data files (S520).

The meta data server may determine the data server on which the data files will be saved (S530) and transmit the identification information on the data server, for example, a name, an IP address, an ID, or the like, as the determined results, to the client terminal (S540).

The client terminal transmits the data files to be stored to the corresponding data server based on the identification information on the data server (S550) and the data server stores the transmitted data files (S560). The data server generates and stores the recovery information on the meta data for the case where the meta data related to the data files are lost (S570) and notifies the storage completion to the client terminal (S580).

When the disc on which the meta data are stored cannot be recovered and the meta data are not separately backed up, the meta data should be recovered by using the recovery information stored in the data server in which the data files are stored. Hereinafter, a process of recovering the meta data will be described with reference to FIGS. 6 and 7.

Figure 6:
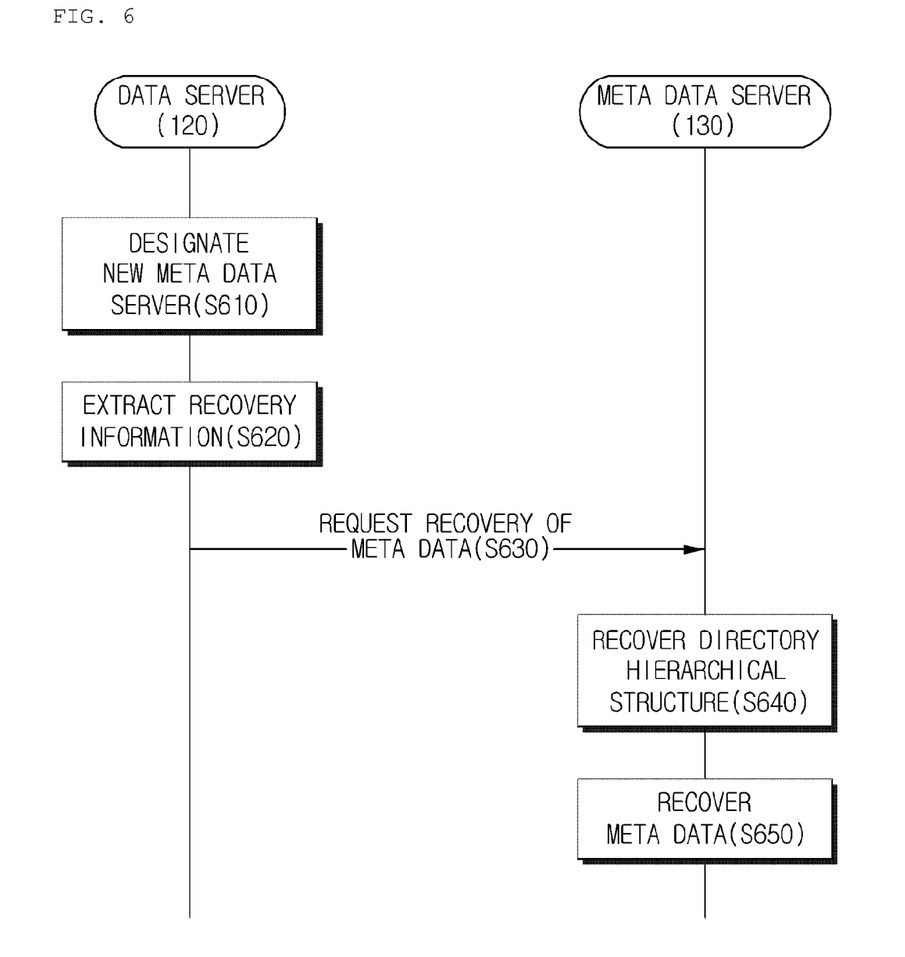
FIG. 6 is an exemplified diagram for explaining a recovery principle of meta data according to an exemplary embodiment of the present invention.

FIG. 6 is an exemplified diagram for explaining a recovery principle of meta data according to an exemplary embodiment of the present invention.

As shown in FIG. 6, when it is impossible to recover the meta data due to the failure of the existing meta data server, a new meta data server is designated to store the recovered meta data (S610).

Then, the data server extracts the recovery information (S620) and provides the extracted recovery information to the meta data server to request the recovery of the meta data (S630).

When the meta data server receives the recovery information, it generates or recovers the directory hierarchical structure included in the recovery information (S640). The meta data server generates the corresponding directory hierarchical structure 'A/B', for example, when the location information called 'A/B/file1' is present in recovery information.

The meta data server recovers the meta data for the data files included in the recovery information when the directory hierarchical structure is generated (S650). The meta data server recovers the meta data related to the data file 'file1' located at, for example, the directory hierarchical structure '/A/B'.

Hereinafter, a process of recovering the meta data will be described in more detail.

Figure 7:
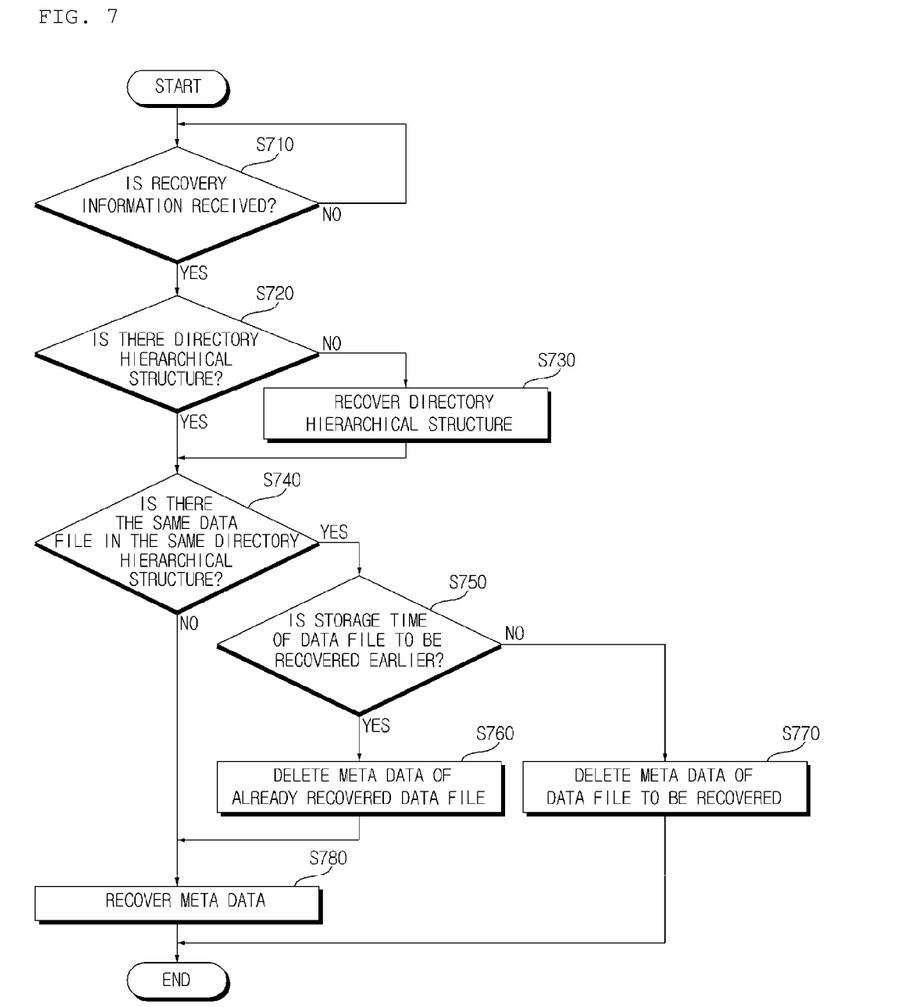
FIG. 7 is an exemplified diagram showing a method of recovering meta data according to an exemplary embodiment of the present invention.

FIG. 7 is an exemplified diagram showing a method of recovering meta data according to an exemplary embodiment of the present invention.

As shown in FIG. 7, when the meta data server receives the recovery information (S710), the meta data server confirms whether the directory hierarchical structure included in the recovery information is present (S720) and if the directory hierarchical structure is not present according to the confirmed results, generates and recovers the corresponding directory hierarchical structure (S730).

For example, when the location information called '/A/B/file1' is present in the recovery information, the meta data server confirms whether the directory hierarchical structure '/A/B' is present and if the directory hierarchical structure is not present according to the confirmed results, the meta data server generates or recovers the corresponding directory hierarchical structure 'A/B'.

The meta data server confirms whether the meta data related to the data files to be recovered are already present on the same directory hierarchical structure when the directory hierarchical structure is recovered (S740). The reason is that there may be the case where the meta data related to 'file1' are present in the directory hierarchical structure 'A/B' even though the location information called 'A/B/file1' is present in the recovery information.

The case corresponds to the case where the existing stored 'A/B/file1' is deleted and enters the wastebasket storage area and the new data file 'file1' is generated in the same directory hierarchical structure 'A/B' and then, the meta data are lost.

In this case, since two 'file1' are present in the data server and the recovery information called the 'A/B/file1' for each of the two 'file1' are identically stored in the data server, the 'A/B/file1' stored in the wastebasket storage area of the meta data server may be first recovered according to the sequence the data server provides the recovery information, such that it is difficult to recover the exact data files.

The meta data server compares the time information included in the recovery information with the storage time included in the meta data already stored if the meta data related to the data files to be recovered are already present according to the confirmed results (S750). That is, the meta data server moves the meta data related to the data files to be recovered to the wastebasket storage area and deletes them, when the time information included in the recovery information is earlier than the storage time included in the meta data already recovered (S770).

On the other hand, the meta data server moves the already recovered meta data to the wastebasket storage area and deletes them when the time information included in the recovery information is later than the storage time included in the meta data already recovered (S760) and recovers the meta data include in the recovery information (S780).

As described above, the exemplary embodiment of the present invention recovers the lost meta data of the meta data server using the recovery information on the meta data stored in the data server when the meta data are lost, but when the plurality of data files are present, determines whether the data files are recovered based on each storage time, thereby making it possible to stably recover the meta data.

Further, the exemplary embodiment of the present invention recovers the lost meta data of the meta data server using the recovery information on the meta data stored in the data server when the meta data are lost, but when the plurality of data files are present, determines whether the data files are recovered based on each storage time, thereby making it possible to prevent the meta data from colliding on the same directory hierarchical structure.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A method for recovering meta data, comprising:
confirming whether a directory hierarchical structure included in recovery information is generated and generating the directory hierarchical structure according to confirmed results, when the recovery information is received from a meta data server;
confirming whether meta data corresponding to the recovery information are already present, when the directory hierarchical structure is generated;
comparing time information included in the recovery information with storage time included in already recovered meta data, when the meta data corresponding to the recovery information are already present; and
moving the already recovered meta data to a wastebasket storage area and deleting the meta data when the time information included in the recovery information is later than the storage time included in the already recovered meta data and recovering the meta data corresponding to the recovery information.

2. The method of claim 1, wherein the recovering moves the already recovered meta data to the wastebasket storage area and deletes the meta data and recovers the meta data to be recovered and the directory hierarchical structure corresponding to the meta data using the recovery information.

3. The method of claim 1, further comprising: recovering the meta data included in the recovery information when the meta data corresponding to the recovery information are not present.

4. The method claim 1, wherein the recovery information include location information on a directory hierarchical structure in which the data files are stored and the stored time information.

5. The method of claim 1, wherein the meta data include an identification ID allocated to the directory hierarchy in which the data files are stored, a name of the data server in which the data files are stored, and a file name of the data files.

6. The method of claim 1, further comprising: moving the meta data related to the data files to be recovered to the wastebasket storage area and deleting the meta data when the time information included in the recovery information is earlier than the storage time included in the already recovered meta data.

* * * * *